(12) United States Patent
Menegoli (10) Patent No.: US 7,224,135 B1
(45) Date of Patent: May 29, 2007

(54) IMPOSED CURRENT MOTOR DRIVE (75) Inventor: Paolo Menegoli, San Jose, CA (US)

(73) Assignee: Acutechnology Semiconductor Inc., San Jose, CA (US)

(*) Notice: Subject to any disclaimer, the term of this patent is extended or adjusted under 35 U.S.C. 154(b) by 0 days.

(21) Appl. No.: 11/516,481

(22) Filed: Sep. 7, 2006

(51) Int. Cl.
H02P 3/08 (2006.01)

(52) U.S. Cl. ............ 318/254; 318/294; 318/434; 318/560; 360/61; 360/68; 360/69; 327/110; 327/423; 363/132

(58) Field of Classification Search ........... 318/138, 318/245, 254, 280, 294, 434, 439, 560; 388/815; 360/61, 68, 69; 327/110, 423, 307, 424; 363/132
See application file for complete search history.

(56) References Cited

U.S. PATENT DOCUMENTS

| 5,297,024 | A | | 3/1994 | Carobolante |
| 5,412,309 | A | * | 5/1995 | Ueunten ............... 323/316 |
| 5,631,527 | A | * | 5/1997 | Canclini ............... 318/254 |
| 5,903,121 | A | * | 5/1999 | Heine et al. .......... 318/434 |
| 6,259,305 | B1 | * | 7/2001 | Pakriswamy ........... 327/424 |
| 6,417,693 | B1 | | 7/2002 | Skahill et al. |
| 6,504,666 | B1 | * | 1/2003 | Patti et al. ............. 360/68 |
| 6,552,593 | B2 | * | 4/2003 | Blon et al. ............. 327/307 |
| 6,678,109 | B2 | | 1/2004 | Kagami et al. |
| 6,861,651 | B2 | * | 3/2005 | Rose .................... 250/396 R |
| 6,972,918 | B2 | * | 12/2005 | Kokami et al. .......... 360/75 |
| 6,998,801 | B2 | * | 2/2006 | Kurosawa et al. ...... 318/254 |
| 7,034,490 | B2 | | 4/2006 | Sawtell et al. |
| 7,035,032 | B2 | * | 4/2006 | Tanner .................. 360/69 |
| 7,042,256 | B2 | * | 5/2006 | Brenden ................ 327/110 |
| 7,072,199 | B2 | * | 7/2006 | Chen et al. ............ 363/132 |
| 2003/0227707 | A1 | * | 12/2003 | Kokami et al. .......... 360/75 |
| 2004/0095183 | A1 | * | 5/2004 | Swize .................... 327/423 |
| 2005/0013029 | A1 | * | 1/2005 | Brenden ................. 360/46 |
| 2005/0018339 | A1 | * | 1/2005 | Tanner .................. 360/69 |
| 2005/0018340 | A1 | * | 1/2005 | Tanner .................. 360/69 |

* cited by examiner

Primary Examiner—Paul Ip (57) ABSTRACT

A method for driving a motor by imposing the current in the motor by means of power current mirrors is presented. This allows driving the motor in current with higher accuracy and lower electrical noise. The Hard Disk Drive application is an example where higher resolution is required for the VCM motor. Furthermore this method reduces the complexity of the system eliminating components and high performance circuits. Moreover this approach reduces the development and manufacturing cost by simplifying the testability and the analysis of the system. The intrinsic elimination of DC offset also takes out the need for the system offset calibration phase and significantly improves on the harmonic distortion of the transfer function. Furthermore this method offers the advantage of faster overall response of the system and higher efficiency. The additional benefit of this method is the ability to have a motor drive system that can be easily and smoothly switched between a PWM drive and a linear drive for different modes of operation of the motor itself.

10 Claims, 6 Drawing Sheets

VCM CONTROL SYSTEM

IMPOSED CURRENT MOTOR DRIVE

BACKGROUND OF THE INVENTION

1. Field of the Invention

The present invention is in the field of motor controller. The present invention further relates to Hard Disk Drive and optical data storage devices. The present invention further relates to methods and circuits for controlling a voice coil motor for positioning the read/write head of a hard disk drive. The implementation is not limited to a specific technology, and applies to either the invention as an individual component or to inclusion of the present invention within larger systems which may be combined into a larger integrated circuit.

The invention also falls within the field of integrated circuits to drive a motor.

2. Brief Description of Related Art

The physical kinetic parameters of a motor such as velocity and acceleration are directly linked to its torque which, in its turn, is directly dependent on the current applied to the motor itself. That is why generally motors are driven in current by means of a control loop that senses the current in the motor and regulates it according to a desired value.

In several fields the accurate control of position, velocity and acceleration of a motor is critical to the overall performance of the system. Some of these fields are: the hard disk drive applications, the optical data storage motor positioning applications, the digital still camera applications to control focus, zoom and other dedicated motors, the printer applications, the robotics and others.

Figure 1:
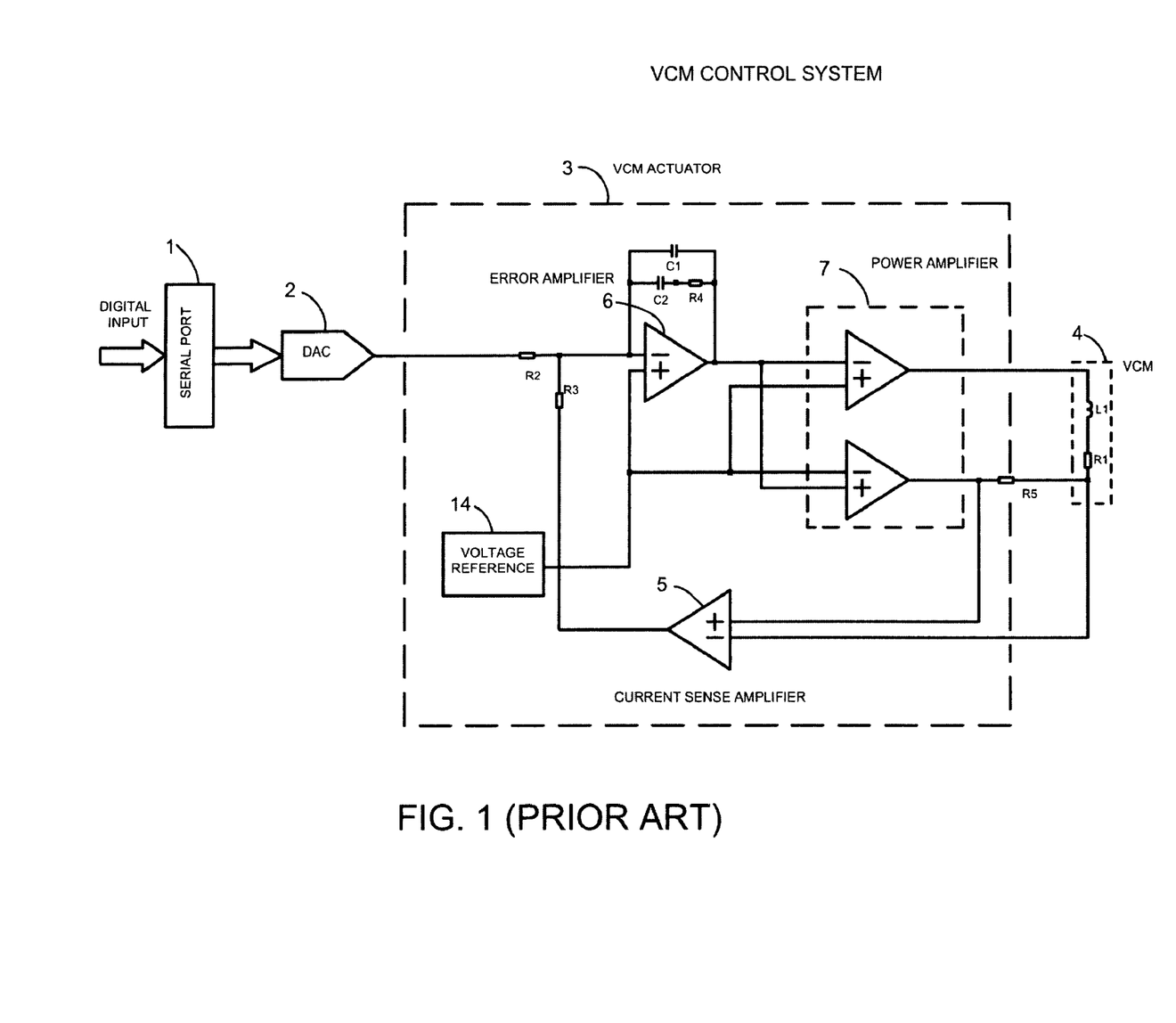
FIG. 1 is a general block diagram showing the prior art of the disk drive VCM control loop.

The position of the read/write head of a disk drive is typically controlled by a linear motor, often referred to as the Voice Coil Motor (VCM). The VCM 4, as shown in FIG. 1, is represented as an inductor L1 in series to a resistor R1 to indicate the main electrical parameters of the motor. The VCM is driven in response to a control loop, known as the servo loop, whose main algorithm is implemented typically within a microprocessor or similar digital processor, and is typically driven in at least three different modes.

A "seek" mode causes the read/write head to move from one track on the disk to a potentially unrelated track, which may require a significant motion. In this mode, the control system typically attempts to control the velocity of the mechanism. In "track follow" mode, the read/write head is relatively stationary, and the control system works to control its precise position to be directly above the appropriate track. In a third mode, the head is driven onto or off of the disk surface to a "park" position, typically using a mechanical ramp to pull the head above the surface of the disk.

As shown in FIG. 1, the VCM control system comprises a serial port 1 that communicates with the microprocessor that contains the main servo algorithm and that drives, with digital signals, a digital to analog converter (DAC) 2. This DAC 2 typically drives a VCM actuator 3 in its various forms and implementations. The VCM actuator 3 commands the current into the VCM 4 which defines its arm's velocity and position on the disk surface.

In addition to the servo loop there is, typically, an inner analog current control loop that drives the VCM as shown in more details in FIG. 1. The serial port 1 drives a Digital to Analog Converter (DAC) 2 which, in its turn, commands the current through the inner current control loop. In this case the VCM actuator block 3 comprises the inner analog current control loop to regulate the current into the VCM 4.

In order to obtain optimal control, the overall servo loop commands a particular current to be driven into the VCM, and an inner analog control loop regulates the current. Practical circuit implementation considerations require that the VCM be driven with conventional amplifiers which impose a voltage across the VCM. The local analog control loop senses the current in the VCM, compares it to the commanded current, and adjusts the drive voltage to maintain the desired current.

The inner analog control loop is driven by a DAC 2 creating an analog representation of the digitally commanded current, and a Current Sense Amplifier (CSA) 5 generates a signal representing the value of the VCM current. These two signals are summed at the input of the error amplifier 6, and this sum is the error in the value of the current.

The error amplifier 6 is conventionally an integrator, with arbitrarily high gain at DC but with gain falling with frequency to maintain the stability of the loop at higher frequencies. As is well known in the art, the passive components C1, C2 and R4 in FIG. 1 determine the bandwidth of the inner analog control loop. This stage might also implement additional frequency/phase shaping for stability. The output of error amplifier 6 feeds the VCM power amplifier 7, typically constituted of two anti-phase linear amplifiers, connected as a "full bridge" capable of applying the full supply voltage across the load in either polarity. In series with the VCM 4 there is a low value resistor R5 used to sense current. The differential voltage across this current sense resistor R5 is fed the differential input of the current sense amplifier 5. Schillaci et al. (U.S. Pat. No. 6,417,639) provided a slightly different but equivalent solution.

Within this loop, the error amplifier is a large bandwidth standard operational amplifier. The DC errors can be initialized out of the loop with software, during the so called "calibration phase" and the AC requirements are generally met with conventional design techniques. The VCM power amplifier 7 is similarly very conventional in design, and it is generally implemented using class AB or pseudo-class AB integrated amplifiers. Typical Class AB stages are implemented with complementary components biased with a stand-by current and feature very low zero-cross distortion.

Zero-cross distortion is an important parameter to measure the ability of the driver to exhibit zero current in the motor when zero current is desired. The so-called "jumps" or "dead-bands" in the transfer function of the amplifier are highly undesirable and typically minimized by the use of class AB stages. When the stages are biased in a similar manner using non-complementary components, as is often the case for the integrated motor driver circuits, they are generally known as pseudo-class AB amplifiers.

The two components of this analog loop that require precision analog design are the current sense amplifier and the DAC. The current sense amplifier's DC error may be calibrated out of the system through parameters in the overall digital control loop. But a large common mode error would be difficult to similarly calibrate out. As the VCM is driven through the extremes of its range, the small signal across the sense resistor also is moved common mode through the entire range. Any failure in the current sense amplifier to reject this common mode signal will result in false detection of VCM current.

The DAC is typically on the order of 12-15 bits, representing a total dynamic range of approximately 70-80 dB. This dynamic range is critical in order to be able to control both very large currents needed to sweep the head across the disk quickly and to control the head position without error over a very small final position (within the disk track). The design of conventional DACs (also known as Nyquist-rate DACs) with this resolution is well known in the art. Furthermore the DAC converts the digital signal representing the current into an analog voltage signal representing the current to be applied to the VCM.

The overall analog control system, including DAC, current sense amplifier, error amplifier and power amplifiers is typically implemented on a single chip, as in Kagami et al. (U.S. Pat. No. 6,678,109), usually along with the control and power stage for the disk drive spindle motor actuator and any other analog/power functions required in the chip. The resultant "combo chip" has a yield which is a product of the yield of all of the subsystems, so any subsystem which carries a risk of yield loss due to performance variations is of great concern in the analysis of system cost.

Carobolante (U.S. Pat. No. 5,297,024) describes an alternate control scheme for the Voice Coil Motor Driver utilizing a current sense resistor in series to the full bridge, a scheme to change the gain of the system by applying power to the motor with one pair of low side transistors or with a different pair of low side transistors and by controlling the gate voltage of the low side transistors with a feedback current control system. This approach, although interesting, does not guarantee a very good zero cross distortion as in the case of the conventional class AB power amplifiers.

It is well known in the art that the conventional DAC can be replaced with a current DAC which has, as an output, an analog current in place of a more traditional analog voltage.

It is also known, that in signal conversion fields, where high accuracy and signal dynamic are necessary, alternate "oversampling" converters and more specifically "one-bit" converters have significant advantage over simple PWM schemes as described in Sawtell et al. (U.S. Pat. No. 7,034,490).

In the Hard Disk Drive (HDD) systems the density of the magnetic data recorded on the disk is increasing very rapidly and that is translated in the number of rotational tracks per inch on the disk surface. The tracks containing the magnetic data are consequently getting narrower and the burden to stay on track with limited Bit Error Rate (BER) during normal operation, is shifted to the ability to control the position of the head on the disk with increasing accuracy.

It is therefore advantageous to reduce as much as possible the sources of electrical noise in the overall drive control loop so that the effective dynamic range is improved.

It is also advantageous to reduce or eliminate as much as possible the number of external components required for the operation of the motor actuation, possibly eliminating also the DC errors that make the calibration phase necessary before regular motor operation.

Nowadays several efforts are increasingly made to improve the overall efficiency of the motor drive especially for the case of battery operated disk drive or more generally motor drives. Class AB amplifiers, although featuring low overall distortion, are constantly biased at a non-negligible stand-by current.

There are also typically two contrasting requirements for a VCM drive system. The motor control has to be very accurate with minimum zero cross distortion in "track follow" operation, and efficient and speedy in "seek" mode. One possible solution to this problem is to define a system that operates in PWM (Pulse Width Modulation), switching the outputs at a given frequency, so as to drive the motor inductance with the bridge transistors either fully off or fully on when in "seek" mode, and that operates in linear mode when in "track follow".

In PWM, the VCM motor may be driven in current mode, the most conventional means to control its torque, or in voltage mode leaving the task to control its acceleration, velocity, position to the outer servo loop that reads the position of the magnetic head off the disk tracks and commands the DAC accordingly. Both methods present their advantage and drawbacks.

Generally the Hard Disk Drive manufacturers are reluctant to drive the VCM motor in PWM because of the possible effects of the EMI (Electro-Magnetic Interferences) introduced by the output stage high frequency switching. This is particularly critical in "track follow", when digital data are being read and written. Therefore it is advantageous to combine the accurate and noise-free linear drive of the motor in "track follow" with the efficient PWM driving in "seek" mode.

Moreover it is advantageous to improve on the bandwidth of the system in order to comply with an ever increasing requirement to drive the motor with faster control especially for the case of micro-drives that employ very small disks and VCM arms.

Accordingly, what is needed is a VCM actuator that is cost-effective, easier to implement, with faster response and with better performance in terms of dynamic range in order to improve the control of the VCM arm and, consequently, the control of the position of the read/write head on the disk.

SUMMARY OF THE INVENTION

It is an object of the present invention to provide a VCM driver that improves upon the accuracy of the motor positioning and that eliminates the DC errors. The utilization of oversampling DAC converter improves significantly upon the dynamic and resolution of the positioning control loop, but the electrical noise introduced by the sense amplifier in traditional motor controls driven in current mode is limiting the overall resolution of the VCM position loop. One of the main advantages of the described configuration is also the fact that, independently of its implementation, it represents a much more cost-effective solution because of the reduced silicon area, elimination of external components, higher yield and simplified testability.

It is another object of the present invention to utilize a "current" digital to analog converter to replace the most traditional voltage DAC. The direct imposition of a current in the motor by selecting its polarity based on the DAC digital input removes the DC error sources. Therefore the calibration phase can be eliminated as well, reducing the time needed to start the hard disk drive operation.

It is another object of the present invention to provide a more efficient and faster motor control architecture that improves on the total needed current consumption, on the overall response time and on the voltage headroom available to the motor drive.

The use of oversampling converter, as explained in details in U.S. Pat. No. 7,034,490 by Sawtell et al, allows substantial improvements in terms of dynamic range and resolution. It is known that the signal to noise ratio for oversampling converters is much higher than the one achieved with more traditional Nyquist digital to analog converters. The sense operational amplifier, that is used to amplify the voltage across the sense resistor in series to the motor for the traditional VCM actuator drive, exhibits typically high common mode rejection but not very low noise.

If an adequate oversampling converter is utilized, the electrical noise introduced by the sense amplifier may represent the largest contribution to noise for the positioning loop and the biggest limitation to a very accurate motor drive.

The elimination of the inner current control loop, with a new scheme by "imposing" a desired current in the motor, removes the sense resistor and the sense amplifier and improves on the overall accuracy of the current. The open loop current drive may be implemented in various forms. The one described in this invention, constitutes a current source based on the digital input of the DAC and on an external resistor to set the overall gain. This current is subsequently mirrored into the power stage and into the motor with the elimination of the class AB stages, of the error amplifier, of the sense amplifier and with the introduction of minimum electrical noise.

The DAC can be implemented as a traditional current output DAC or as an oversampling sigma delta modulator whose one bit bitstream output modulates a current representing the full-scale value to obtain the overall output current. Clearly the advantages of the oversampling current DAC are numerous and have been already detailed in Sawtell et al. (U.S. Pat. No. 7,034,490). One of the challenging problems in this type of implementations is the modulation of a full-scale current at frequencies on the order of several MHz.

The most common difficulties are in maintaining a good accuracy, minimizing signal distortion while commutating the switches at high frequency to modulate the current. The clock feed-through of the switch can be minimized with the same techniques used in switched capacitor circuits. The gate to source capacitance of the current mirror at the output of the digital to analog converter performs a first analog filtering action that eliminates the high frequency components of the signal.

Figure 2:
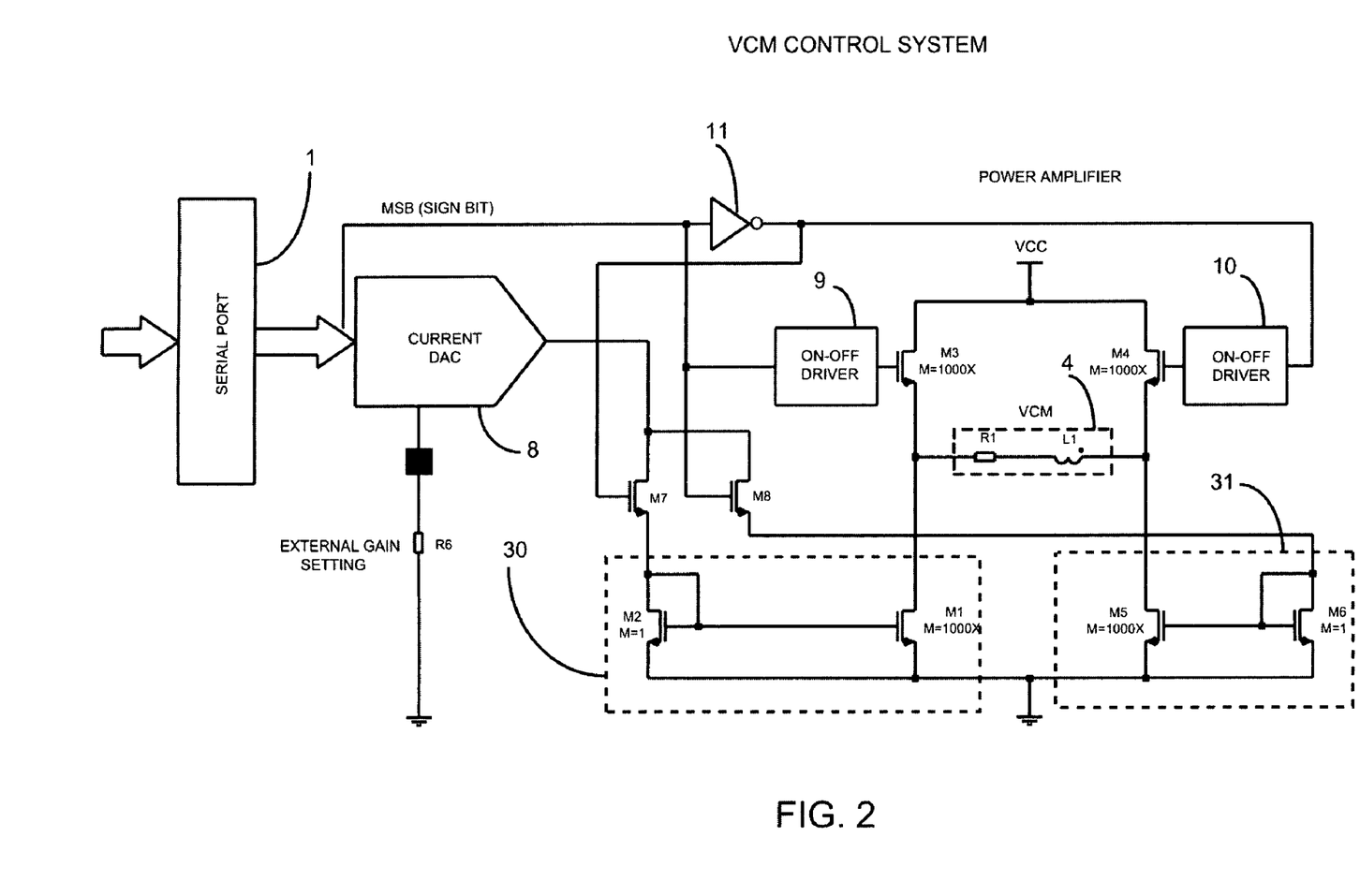
FIG. 2 is a circuit diagram showing a detailed implementation of the basic VCM control system in accordance with an embodiment of the present invention.

The mirroring of the current into the power devices and into the VCM load may be implemented in several ways. In its simplest form, as shown in FIG. 2, the current mirror translates in at least two MOS devices. The first MOS device constitutes the reference device and it is biased at an output DAC current, the second MOS device is the output power device and delivers the desired output current. The MOS devices are generally sized differently in order to achieve the desired current ratio between the reference current and the output current value. The larger size output device constitutes also part of the power stage. The mirror devices size ratio is generally quite large (several hundreds to a few thousands) to obtain large currents in the power stage consuming small current in the reference device.

The power stage is typically configured as a full bridge, with two low side drivers and two high side drivers. The full bridge configuration allows the application of the full current to the load in both directions. The high side transistors may be P-type MOS or DMOS devices or N-type MOS or DMOS devices. The imposition of the current by mirroring may be applied to the high side transistors or to the low side driver transistors, even though it may be more effectively implemented if applied to the low side transistors.

If the mirroring of the current is applied to the low side driver transistors, the high side transistors are driven simply by turning the devices fully on or fully off. Consequently the high side driver circuits are very much simplified with respect to the pseudo class AB stages used in the traditional VCM power amplifier stage. The signal that selects the high side drivers can be derived from the Most Significant Bit (MSB) of the digital input of the DAC, since this bit represents the sign of the current. This also has the effect to simplify the current output DAC, because the DAC output turns out to be only a positive current.

One of the most important advantages of this implementation is that if a null current is commanded by the servo loop, since the current DAC is working in one direction only, a true zero current should be passed to the load. This implies that no DC offset is present and consequently the calibration phase is not necessary. This implementation also guarantees that there is basically no low frequency zero cross distortion.

Similarly the higher frequency zero cross distortion can be very low as long the stage is implemented properly. If latency is present in the analog signal path through the DAC and the current mirror, an equivalent latency has to be introduced in the digital signal path to prevent dynamic "jumps" in the transfer function. The change of polarity that is commanded by the digital input of the DAC may occur when the current in the output stage is not zero yet and this may also be prevented by the implementation of conventionally known circuit techniques to obtain very low distortion.

Another important advantage is the elimination of the sense amplifier, of the error amplifier and of the pseudo class AB driver stages resulting in simpler design, higher yield, lower silicon area, smaller number of needed bonding pads and less external components in the application.

In particular, the testability of this circuit is much more simplified with respect to the more traditional approach where each single block, like the error amplifier or the sense amplifier has to be fully tested in all its main electrical parameters to guarantee functionality and performance of the whole current analog loop. The presented system can be tested by a simple measurement and verification of the "current to current" transfer function, from the DAC output to the power stage output.

Furthermore, the elimination of the current regulation loop implies the inherent stability of the system, the reduced current consumption yielding to higher efficiency and the faster response to the commanded signal to the DAC because the application of the motor current is set by an open loop circuit and it is not delayed by the integrator time constant of FIG. 1.

Clearly the current mirror is one of the most critical elements of the motor drive system. In particular, it is important for the current mirror to have excellent performance in terms of linearity, harmonic distortion, current gain and AC response independently from load conditions, temperature and supply voltage variations.

Figure 3:
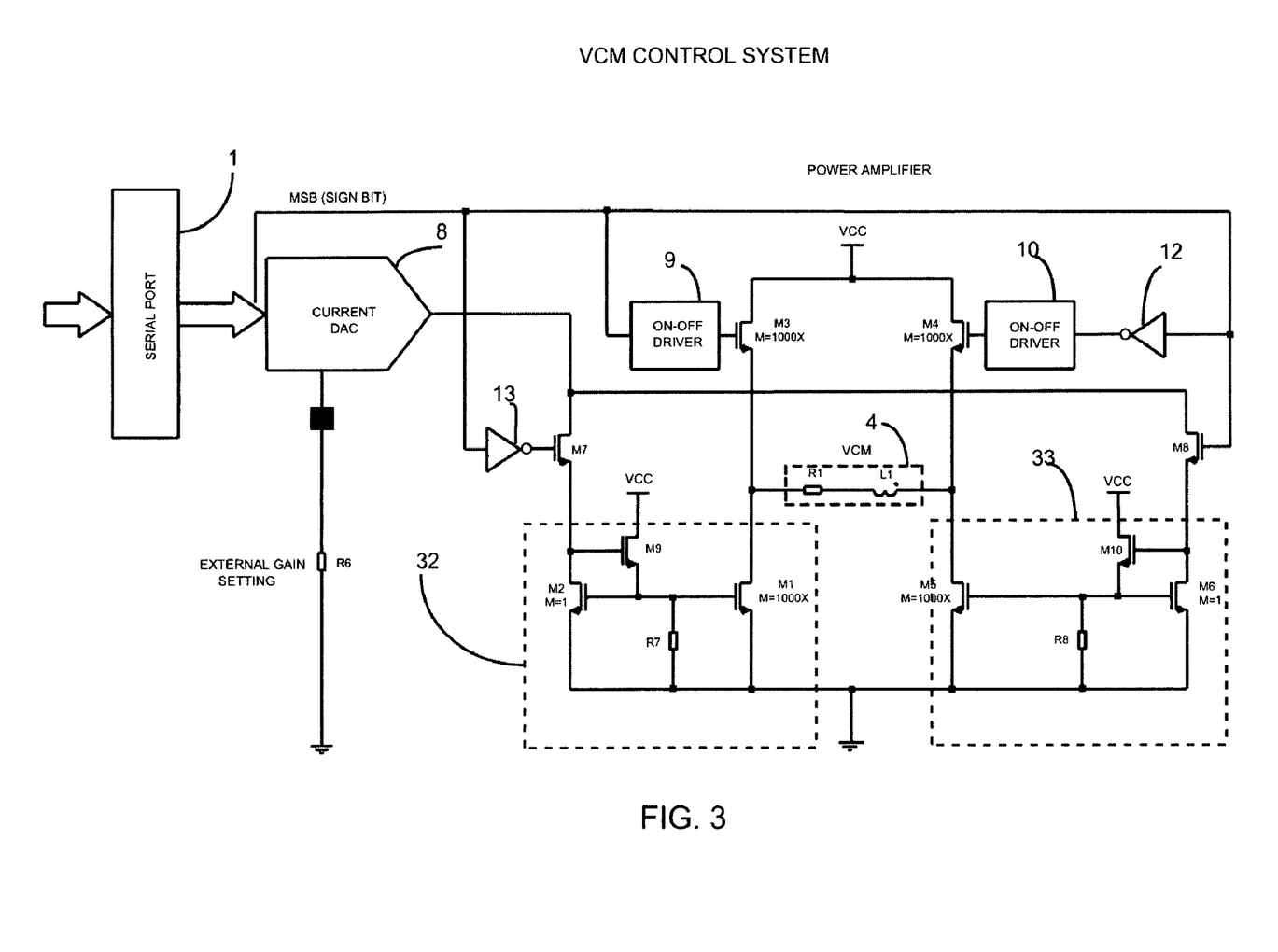
FIG. 3 is a circuit diagram showing a more detailed implementation of the VCM control system with a better performing "current mirroring" in accordance with another embodiment of the present invention.

Typically the gate capacitance of the low side transistors is quite large therefore a simple diode connection current mirror circuit topology that includes these transistors may be impractical because too slow to react to signal variations. This may require a more sophisticated current mirror circuit, as shown in FIG. 3, buffering the higher impedance of the reference signal onto a lower impedance at the gate of the power transistors in order to achieve better AC performance. This buffering may be achieved in several ways using conventional circuit techniques.

One of the limitations of the mirroring of the current into the output transistors is that, since the transconductance of the power devices is very high, their output impedance is typically low. This causes the output current to be dependent on the output voltage. This is potentially a source of harmonic distortion and gain error.

It is important to note that when the maximum current in the motor is required, a high current is also flowing in the reference device of the mirror and generally, if the mirror transistors are sized properly, the gate voltage of the output transistor is high enough to drive it in the triode region with minimum on-resistance. However when either the maximum DAC digital input or an analog threshold is reached, an additional circuit that pulls the gate voltage of the mirror output transistor to the maximum allowed voltage can be introduced. That would guarantee that the transistor is fully turned on with minimum voltage drop between its drain and its source.

Figure 4:
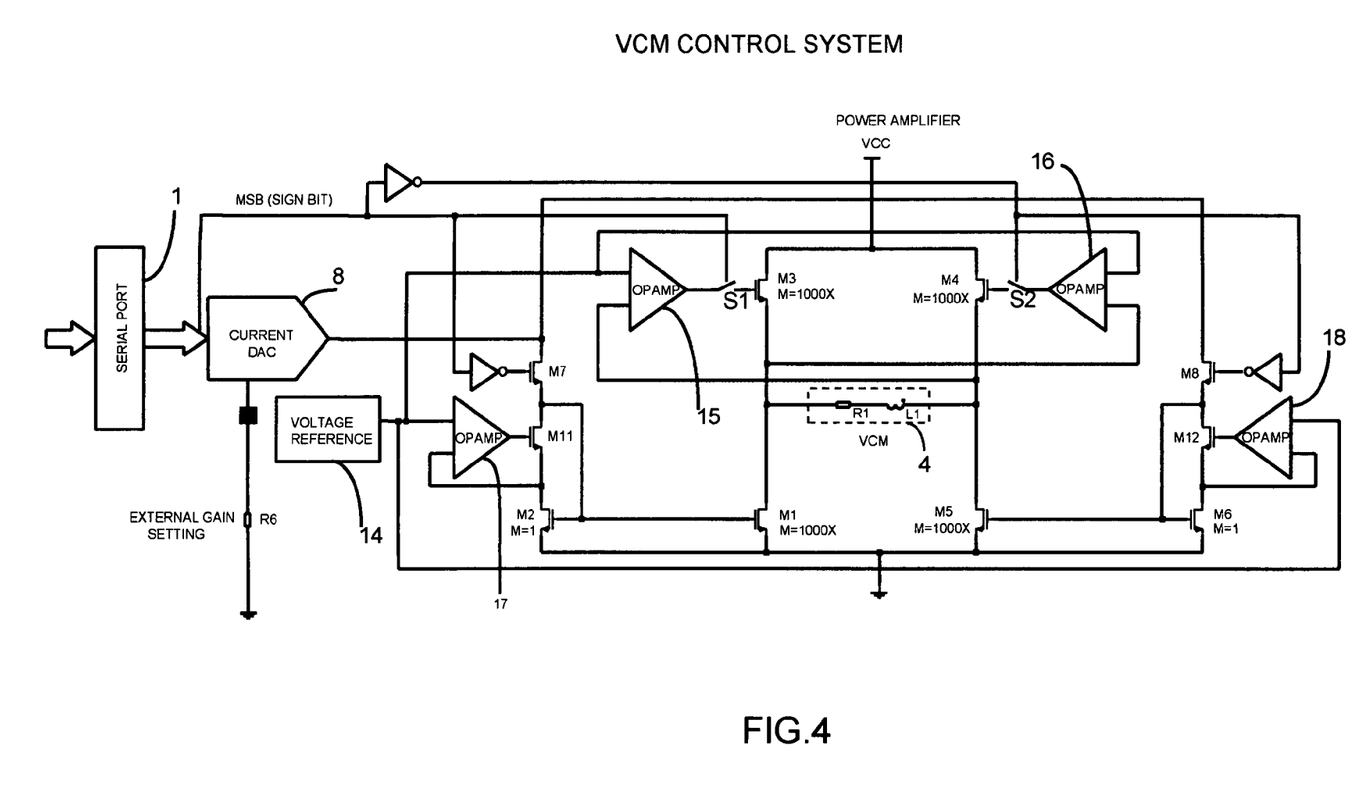
FIG. 4 is a circuit diagram showing a detailed implementation of the VCM control system with common mode voltage control in accordance with the present invention.

In a further embodiment of the present invention, as depicted in FIG. 4, the high side transistors are driven by operational amplifiers that regulate the output of the opposite half bridge to be at a given voltage. This embodiment provides a regulated low common mode voltage at the outputs.

This implementation includes a means to control the output common voltage through the regulated drive of the high side devices and exhibits a much lower harmonic distortion because the drain voltage of the output transistors does not change especially during "track follow" operation, when the motor current is typically not very large.

Figure 5:
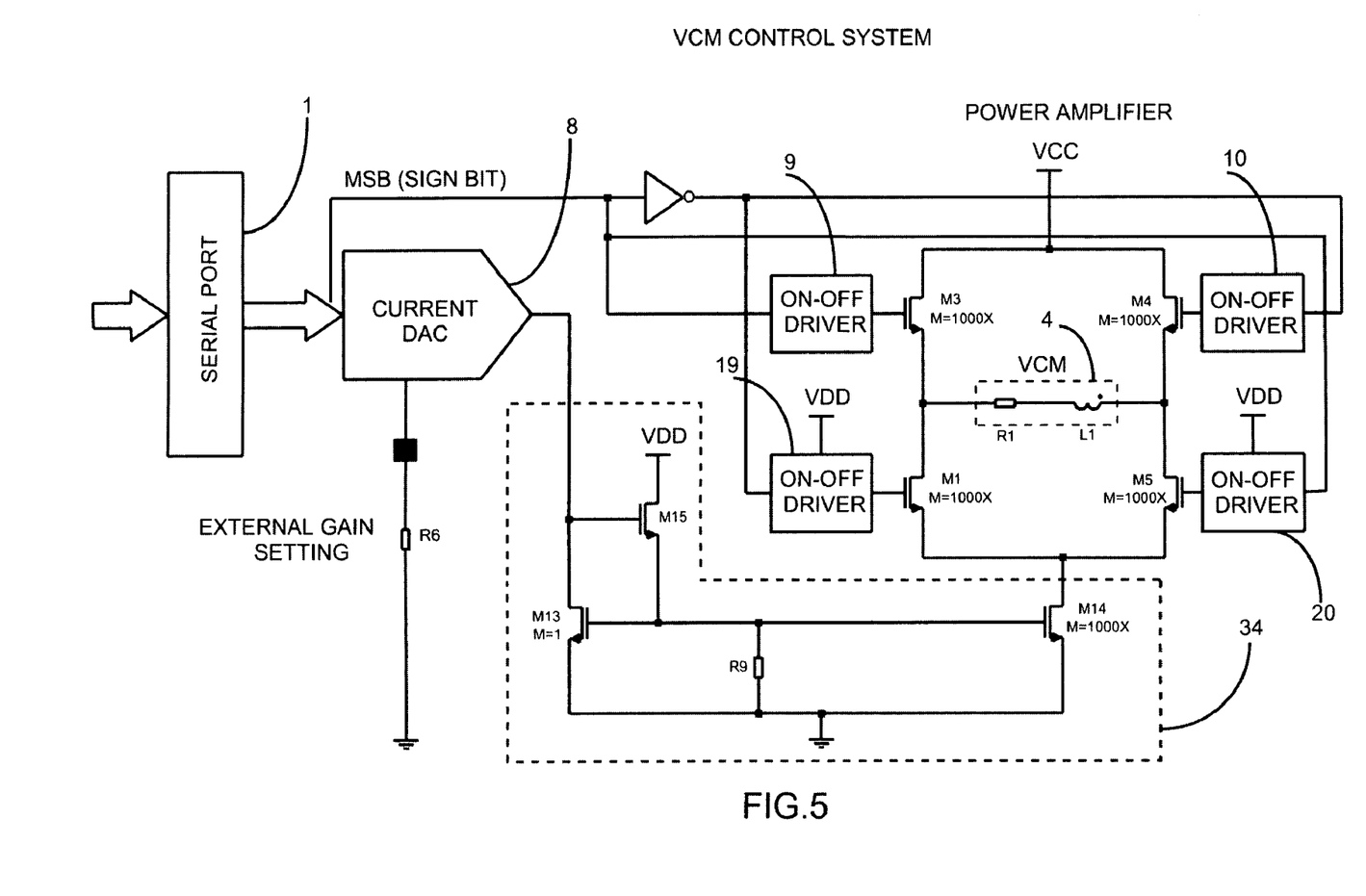
FIG. 5 is a circuit diagram showing a detailed implementation of the VCM control system in accordance with a preferred embodiment of the present invention.

In a further preferred embodiment of the present invention shown in FIG. 5, one power transistor that represents the output device of the power current mirror is connected in series to a full bridge stage. This configuration requires a larger silicon area because of the additional power transistor in series to the bridge components, but, due to the nature of the circuit, this transistor does not have high voltage requirements, therefore its specific on resistance is much lower than the one for the bridge transistors, not adding significant additional silicon area.

This additional transistor does not require high voltage capabilities because, by driving the low side driver transistors with lower gate voltage, they function like cascode devices, limiting the maximum voltage at the drain of the additional series power transistor. This constitutes an important advantage because the accurate mirror current matching is typically much more difficult to obtain with high voltage devices or DMOS transistors, therefore the current mirror that utilizes lower voltage transistors guarantees a more repeatable and precise current gain.

This extra transistor does not add to the total series resistance of the load, with respect to the more traditional approach, because generally an external resistor (of approximately 250 mohms) is used to sense the current. This sense resistor contributes significantly to the voltage drop at the load, limiting the maximum motor current and the "seek" time and it is no longer needed in the present approach. Modern CMOS process technologies allow the utilization of 200 mohms on resistance low voltage MOS devices without requiring a significant silicon area.

This implementation allows further circuit simplification because the low side drivers are also driven "digitally", either fully on or fully off, controlled by the MSB of the digital to analog converter digital input, and because the mirroring of the current is limited to only one power mirror. In fact, while the implementation with two current mirrors has to guarantee the electrical matching between the two mirrors, this implementation is more straightforward.

Moreover, in the traditional motor drive implementation, cross conduction protection circuits are necessary to prevent two power transistors in the same half bridge to be conducting at the same time. This is mainly because the extremely high current could potentially damage the device and secondly because shoot through current would adversely affect the efficiency of the drive. The design of these cross conduction protection circuits is generally quite challenging because these circuits have to monitor both gate and source of the power transistors and simultaneously guarantee a fast transition. With the present invention, while the power transistors cross conduction still has to be prevented, these complex cross conduction protection circuits are no longer necessary because the current is always controlled by the series power transistor that is part of the current mirror.

As previously mentioned, generally the Hard Disk Drive manufacturers are reluctant to drive the VCM motor in PWM because of the possible effects of the EMI (Electro-Magnetic Interferences) introduced by the high frequency switching. This is particularly critical in "track follow" and more acceptable in "seek" mode. The implementation of FIG. 5 allows an easy transition from PWM operation, either in voltage mode or current mode, to linear imposed current operation. In fact the power transistor in series to the bridge could be driven in the triode region while the four bridge transistors are switched on and off alternatively at the desired PWM frequency for switching operation and it may be in "mirror configuration", imposing a current in the motor, in linear operation.

Furthermore in PWM operation, in "current mode", the power transistor in series to the bridge, driven in the triode region, could be utilized to sense the current in the motor by simply sensing the voltage across its drain-source terminals. Based on these simple considerations, the present configuration can lead to a cost effective motor drive system where the motor is driven in "linear imposed current mode" in "track follow" while it is driven in "PWM mode" in "seek" operation. This clearly would improve the efficiency of the system without adding much complexity to the motor driver, allowing a smooth and easy transition between the two modes of operation.

As is clear to those skilled in the art, this basic system can be implemented in many specific ways, and the above description is not meant to designate a specific implementation. Similarly, this basic system has been described with particular attention to the Hard Disk Drive applications, but it can also be implemented more generally for the control of any motors where the current into the motor is "imposed" rather than sensed and controlled by a feedback system.

BRIEF DESCRIPTION OF THE DRAWINGS

Further details of the present invention are explained with the help of the attached drawings in which.

DETAILED DESCRIPTION OF SPECIFIC EMBODIMENTS

A. FIG. 2

FIG. 2 shows a general embodiment for the basic VCM driver control system utilizing a Digital to Analog Converter 8 whose output constitutes an analog current whose value is set by the digital input of the DAC 8 and by an external resistor R6. This analog current is subsequently mirrored into the full bridge to drive the desired current in the VCM actuator 4.

The full bridge is configured with two high side power transistors M3 and M4 and with two low side power transistors M1 and M5. The full bridge configuration allows the application of the full current to the load in both directions. The high side transistors may be P-type MOS devices or N-type MOS devices.

The mirroring of the current into the power devices and into the VCM load may be also implemented in several ways. In its simplest form of FIG. 2 the current mirrors 30 and 31 translate in the couples of MOS devices M2, M1 and M5, M6 sized differently in order to achieve the desired current ratio between the reference current and the output current value. The larger size devices M1 and M5 constitute also part of the full bridge power stage.

The high side transistors M3 and M4 are driven simply by turning the devices fully on or fully off. The complementary signal that commands the high side drivers 9 and 10 can be derived from the MSB of the digital input of the DAC, since this bit represents the sign of the current. This also has the effect to simplify the current output DAC 8, because the DAC output turns out to be only a positive current.

The same MSB signal and its complement at the output of the inverter 11 drive respectively the transistors M8 and M7 that switch the DAC 8 analog output current into one mirror or the other depending on the polarity of the DAC digital input, with the result of driving the motor 4 with a positive or a negative current.

The resistor R6, that can be external to the integrated device, is setting the overall gain of the servo loop. Since the current DAC 8 is working in one direction only, a true zero current should be passed to the load. This implies that no DC offset is present and therefore the calibration phase is not necessary. This configuration, if implemented appropriately, also guarantees a zero-cross distortion comparable to the one achieved by the more conventional class AB stage.

The current imposed in the motor is given by the ratio of the size of the transistors of the mirrors 30 and 31, however sometimes, especially when using DMOS transistors, it may be difficult to achieve the desired size of the reference transistor in relation to the size of the power transistor. This could lead to a current matching error which translates into a gain error in the system. Generally, this gain error is automatically corrected by the servo loop, but it could also be trimmed, in the integrated circuit, with conventional techniques to obtain the desired gain.

It is important to note that when the maximum current in the motor 4 is required, as is often the case for the "seek" mode operation, a high current is also flowing in the reference device M2 or M6 of the mirrors 30 or 31 and generally, if the mirrors transistors are sized properly, the gate voltage of the output transistor M1 or M5 is high enough to drive it in the triode region with minimum on-resistance. However, when either the maximum DAC digital input or an analog threshold is reached, an additional circuit that fully turns on the output transistor M1 or M5 could be added.

As is clear to those skilled in the art, this basic system can be implemented in many ways, and the above description is not meant to designate a specific implementation. For instance the setting of the motor current by mirroring may be applied to the high side transistors or to the low side driver transistors. In the embodiment of FIG. 2 it is applied to the low side transistors with mirrors 30 and 31.

B. FIG. 3

FIG. 3 displays another embodiment of the present invention for the VCM control system including a better performing means of implementing the current mirroring in accordance with the present invention.

FIG. 3 is very similar to FIG. 2 in most of its elements. Functionally analogous to the inverter 11 of FIG. 2, the inverters 12 and 13 provide the complementary signals to select one of the two current mirrors, by means of the switches M8 and M7, and one of then two high side transistors M3 and M4. Driving the gate of the current mirrors, that include the low side power transistors M1 and M5, in presence of high frequency and low amplitude signals, may be problematic if the current mirrors are implemented in their simplest form as in FIG. 2. In fact the power devices are generally physically large in area, and therefore their gate-source capacitance is significant. The charge of the mirrors gate capacitance in the case of FIG. 2 may be too slow, especially in proximity of the transfer function zero-cross when the current signal from the DAC 8 is very small.

That might translate in zero cross distortion and is generally not acceptable in "track-follow" operation. Therefore a faster current mirror circuit has to be implemented. The mirrors 32 and 33 in FIG. 3 are constituted of transistors M9 and M10 and resistors R7 and R8, in addition to the transistors M2, M1, M6 and M5. The transistors M9 and M10 can drive the gate of the power transistors M1 and M5 with high enough currents, determined by the resistors R7 and R8, even in the presence of weak signals. The smaller gate-source capacitance of the transistors M9 and M10 makes the current mirrors 32 and 33 faster because the charge of the gates of M9 and M10 requires less current.

A more sophisticated implementation of current mirrors, as are well known in the art, may be necessary to guarantee low harmonic distortion and better AC performance. Many other current mirror implementations using conventional known techniques are possible to further improve their performance.

C. FIG. 4

FIG. 4 represents another embodiment of the VCM control system with "imposed current" and with common mode voltage control in accordance with the present invention. In FIG. 4 a voltage reference block 14 is added. This voltage reference could be set for any voltage, but a low voltage of approximately a few hundreds mV is desirable to provide full voltage swing at the load in "seek" mode.

In the embodiment of FIG. 4 the high side transistors M3 and M4 are not simply driven fully on or fully off. They are driven by the operational amplifiers 15 and 16, selected respectively by the switches S1 or S2, in order to control the drain voltage of the conducting low side transistor to be the same as the reference voltage. One of the problems of the embodiments of FIG. 2 and FIG. 3 is that, due to the high transconductance and low output impedance of the low side power transistors M1 and M5, the mirror current regulation may not be accurate enough with variations of the motor load and/or of the supply voltage.

This embodiment guarantees that the drain voltage of the conducting low side transistors is always the same independently from the load current. In fact the common mode voltage of the full bridge is set to be around the reference voltage. This scheme provides excellent current transfer characteristic from the DAC output current to the motor current.

Furthermore, in FIG. 4 the current mirrors are implemented using the operational amplifiers 17 and 18 in order to regulate the voltage at the drain of the reference transistor of the conducting mirror to be also the reference voltage. This further improves on the accuracy of the mirror because both transistors of the mirror operate at the same drain-source voltage.

As is clear to those skilled in the art, this basic system can be implemented in many ways, and the above description is not meant to designate a specific implementation. Analogous known techniques make use of current mirrors and accurate voltage regulating circuits in various configurations. However, it is clear that the motor control may be implemented by imposing a current in the motor as described in the above described embodiments.

D. FIG. 5

FIG. 5 represents the VCM control system in accordance with a preferred embodiment of the present invention comprising a single current mirror 34, in series to the full bridge, to impose the desired current in the motor.

In this configuration all the four power transistors of the full bridge are driven either fully on or fully off and the current into the motor 4 is controlled by the current mirror 34 in series to the bridge constituted by the transistors M13, M14 and M15 and the resistor R9. The full bridge power transistors are selected to be the conducting ones by the MSB of the digital input of the current DAC 8. The drivers 9,10, 19, and 20 are selected alternatively by the output of the inverter 11 and its complementary signal. The transistor M14 is a large device because it has to conduct all the motor current with low on-resistance. However this transistor does not have high voltage requirements.

In fact, as long as the driver blocks 19 and 20, that activate the low side transistors, are powered off a lower voltage, for instance 3.3V or 5V, in FIG. 5 designated as VDD, then the transistors M1 and M5 function as cascode devices for the transistor M14 limiting its maximum drain voltage. This implies that the transistor M14 can generally be much smaller in silicon area and therefore have a smaller gate capacitance. This is a significant advantage since this device M14 does not add to the total series resistance of the load with respect to the more traditional approach, because generally an external resistor is used to sense the current and this resistor contributes significantly to the voltage drop at the load limiting the maximum motor current and consequently the "seek" time.

Furthermore, the output transistor M14 of the power current mirror 34 can be made physically smaller than the power transistors of the bridge, and that guarantees a lower harmonic distortion when the signal has relatively high frequency content and low amplitude with respect to the embodiments of FIG. 2, FIG. 3 and FIG. 4, because the gate driving of the mirror transistors M13 and M14 is achieved more effectively. Moreover while the implementations of FIG. 2, FIG. 3 and FIG. 4 with two current mirrors had to guarantee the electrical matching between the two mirrors, the embodiment of FIG. 5 is more straightforward because the mirroring of the current is limited to only one power mirror.

Moreover the mirror current ratio is typically much more difficult to control using high voltage devices or DMOS transistors, therefore the mirror 34 that utilizes standard CMOS low voltage transistors guarantees a more controlled and repeatable current gain.

The VCM motor 4 can be driven in linear mode or in PWM (pulse width modulation) mode. In PWM the VCM motor may be driven in current mode, the most conventional means to control its torque, or in voltage mode leaving the task to control its acceleration, velocity and position to the outer servo loop that reads the position off the disk tracks and commands the DAC accordingly. When the motor is driven in PWM, the system has the advantage to be more efficient since the devices are always either fully off or fully on.

Generally the Hard Disk Drive manufacturers are reluctant to drive the VCM motor in PWM because of the possible effects of the EMI introduced by the high frequency switching. This is particularly critical in "track follow" operation. The embodiment of FIG. 5 allows an easy transition from PWM operation, either in voltage mode or current mode, to "linear imposed current" operation. In fact the power transistor M14 could be driven in the triode region, while the four bridge transistors are switched on and off alternatively at the desired PWM frequency, or it may be in mirror configuration imposing a linear current in the motor.

When in PWM operation, in "current mode" drive, the power transistor M14, in series to the bridge, driven in the triode region, could be utilized to sense the current in the motor by simply sensing the voltage across its drain and source terminals. Based on these simple considerations, the present circuit topology can be configured as a cost effective motor drive system where the motor can be driven in "linear imposed current mode" in "track follow", while it can be driven in "PWM voltage mode" in "seek" operation. This has the effect of improving the efficiency of the system without adding much complexity to the motor drivers, allowing a smooth and easy transition between the two modes of operation.

Figure 6:
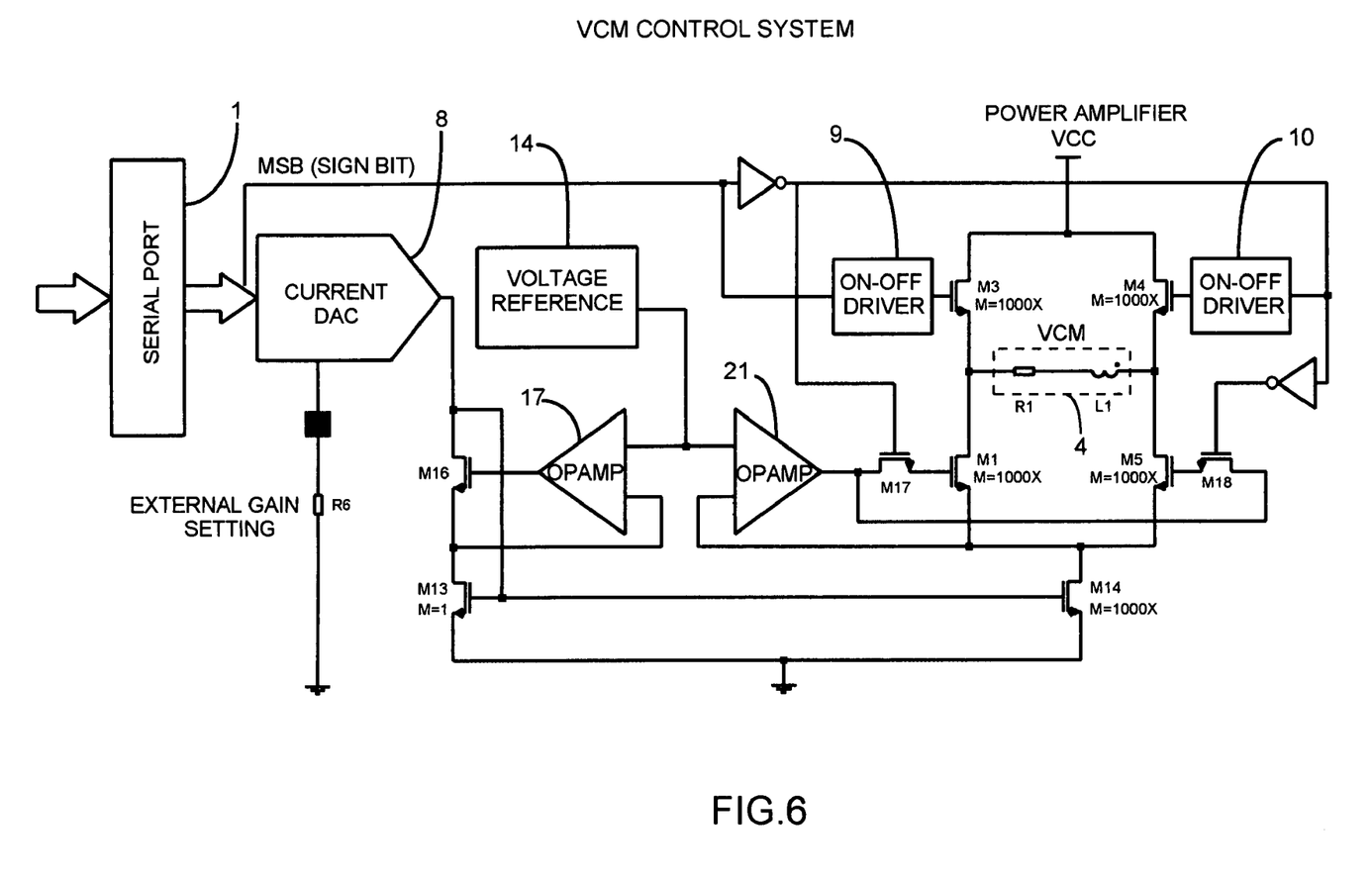
FIG. 6 is a circuit diagram showing a detailed implementation of the VCM control system in accordance with another preferred embodiment of the present invention.

E. FIG. 6

FIG. 6 displays a circuit diagram showing a detailed implementation of the VCM control system in accordance with another preferred embodiment of the present invention. Similarly to the embodiment of FIG. 4, FIG. 6 employs two operational amplifiers 17 and 21 to regulate the voltage at the drain of transistors M13 and M14 to be the same independently from load conditions and/or power supply voltage.

The operational amplifiers 17 and 21 impose a voltage at the gate of the transistors M16 and, alternatively, M1 and M5 such that the voltage at the drain of the transistors M13 and M14 constituting the current mirror is the output of the voltage reference 14. The voltage reference is selected to be preferably a few hundreds mV. The transistors M17 and M18 switch the voltage at the output of the operational amplifier 21 to drive either of the gates of the low side transistors M1 and M5 of the bridge dependently on the polarity of the MSB of the digital output of the serial port 1 which determines the sign of the current imposed to the motor.

The embodiment of FIG. 6 has all the advantages described for FIG. 5, the main difference being that the low side transistors M1 and M5 are not driven either fully off or fully on, but with the additional benefit of a lower harmonic distortion because the current mirror transfer function is more linear with variations of the signal.

A similar implementation could alternatively drive the gate of the high side transistors to control the voltage at the drain of the transistor M14, switching fully on or fully off the low side transistors, obtaining the same final result.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A motor drive system comprising:
   a motor having two terminals;
   a power amplifier circuit coupled to said motor;
   a pair of current mirrors coupled to said power amplifier circuit;
   a plurality of selection switches coupled to said current mirrors, and
   a digital to analog converter coupled to said selection switch devices;
   wherein said power amplifier circuit is comprising a pair of high side transistors having current paths connected between respective terminals of said motor and a voltage source, and a pair of low side transistors having current paths connected between respective terminals of said motor and the electrical ground terminal;
   wherein said current mirrors comprise a reference device biased at a first current, responsive to the output of said digital to analog converter, and a differently sized interconnected transistor of said pair of low side transistors of said power amplifier circuit conducting an output current which is a scaled value of said first current;
   wherein said selection switches operate to select one transistor of said pair of high side transistors of said power amplifier circuit and one of said pair of current mirrors to establish a current path through the selected transistors and the motor in response to a current polarity signal, such that at any time two transistors of said power amplifier circuit are turned on and two transistors of said power amplifier circuit are turned off;
   wherein the input of said digital to analog converter is a digital signal whose most significant bit is representative of said current polarity signal and the output of said digital to analog converter is said first current, representative of the current to be applied to said motor through the selected current mirror, and
   whereby said motor drive system receives a digital signal representative of a current and its polarity and imposes a scaled value of said current to said motor.

2. The motor drive system of claim 1 comprising a plurality of current mirrors, wherein said motor is a multiphase motor with multiple terminals and said power amplifier circuit comprises multiple high side transistors and multiple low side transistors coupled to said multiphase motor.

3. The motor drive system of claim 1 wherein said motor is used in a magnetic or an optical data storage system.

4. A motor drive system comprising:
   a motor having two terminals;
   a power amplifier circuit coupled to said motor;
   a current mirror coupled to said power amplifier circuit;
   a plurality of selection switches coupled to said power amplifier circuit, and
   a digital to analog converter coupled to said selection switches;
   wherein said power amplifier circuit is comprising a pair of high side transistors having current paths connected between respective terminals of said motor and a voltage source, and a pair of low side transistors having current paths connected between respective terminals of said motor and an output device of said current mirror;
   wherein said current mirror comprises a reference device biased at a first current responsive to the output of said digital to analog converter, and said output device coupled between said power amplifier circuit and the ground terminal, said output device conducting a second current which is a scaled value of said first current;
   wherein said selection switches operate to select one transistor of said pair of high side transistors and one transistor of said pair of low side transistors of said power amplifier circuit to establish a current path through the selected transistors, said current mirror and said motor in response to a current polarity signal;
   wherein the input of said current digital to analog converter is a digital signal whose most significant bit is representative of said current polarity signal and the output of said digital to analog converter is a signal representative of the current to be applied to said motor through said current mirror, and
   whereby said motor drive system receives a digital signal representative of a current and its polarity and imposes a scaled value of said current to said motor.

5. The motor drive system of claim 4, wherein said motor is a multiphase motor with multiple terminals and said power amplifier circuit comprises multiple high side transistors and multiple low side transistors coupled to said multiphase motor.

6. The motor drive system of claim 4 wherein said motor is used in a magnetic or an optical data storage system.

7. A method for achieving accurate current driving of a motor, comprising:
   generating a digital signal representative of the polarity of the current to be applied to said motor and a first current, representative of said current to be applied to said motor, in response to a digital input signal representative of said current to be applied to said motor;
   generating a current mirror circuit coupled in series to a bridge power amplifier to be coupled to said motor, wherein said current mirror circuit comprises a reference device biased at said first current, and a differently sized interconnected output device conducting a second current which is a scaled value of said first current, and
   applying said second current to said motor by means of said current mirror and of said bridge power amplifier;
   whereby said current driving of said motor is applied in an open loop configuration.

8. The method of claim 7 wherein the power transistors of said bridge power amplifier constitute the output transistors of multiple current mirrors that conduct said current to be applied to said motor.

9. The method of claim 7 wherein said current driving of said motor is applied in switching mode.

10. The method of claim 7 wherein said motor is used in a magnetic or an optical data storage system.

* * * * *